(12) United States Patent
Han et al.

(10) Patent No.: US 9,051,181 B2
(45) Date of Patent: Jun. 9, 2015

(54) GAS STORAGE MATERIAL AND METHOD FOR GAS STORAGE

(75) Inventors: Yang-Kyoo Han, Seoul (KR); Je-Gwon Lee, Seoul (KR); Su-Hwa Kim, Seongnam-si (KR); Jae-Yong Kim, Seoul (KR); Sang-Hwa Lee, Seoul (KR)

(73) Assignees: LG CHEM, LTD., Seoul (KR); IUCF-HYU (INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 222 days.

(21) Appl. No.: 13/880,325

(22) PCT Filed: Aug. 26, 2011

(86) PCT No.: PCT/KR2011/006337
§ 371 (c)(1), (2), (4) Date: Apr. 18, 2013

(87) PCT Pub. No.: WO2012/057445
PCT Pub. Date: May 3, 2012

(65) Prior Publication Data
US 2013/0216472 A1    Aug. 22, 2013

(30) Foreign Application Priority Data
Oct. 29, 2010   (KR) .................. 10-2010-0107069

(51) Int. Cl.
*C01B 3/00* (2006.01)
*B01J 20/26* (2006.01)
*B01J 20/28* (2006.01)
*C08F 120/56* (2006.01)
*C08F 120/60* (2006.01)

(52) U.S. Cl.
CPC ............ *C01B 3/0015* (2013.01); *B01J 20/262* (2013.01); *B01J 20/28004* (2013.01); *B01J 20/28023* (2013.01); *B01J 20/28083* (2013.01); *C01B 3/001* (2013.01); *C08F 120/56* (2013.01); *C08F 120/60* (2013.01); *Y02E 60/328* (2013.01)

(58) Field of Classification Search
CPC ................................................... C08F 120/56
See application file for complete search history.

(56) References Cited

U.S. PATENT DOCUMENTS

| | | |
|---|---|---|
| 5,766,757 A | 6/1998 | Tanaka et al. |
| 2004/0024152 A1* | 2/2004 | Toyama et al. ............... 526/227 |
| 2011/0194304 A1* | 8/2011 | Han et al. ..................... 362/555 |

FOREIGN PATENT DOCUMENTS

| | | | |
|---|---|---|---|
| KR | 10-2003-0049208 | | 6/2003 |
| KR | 10-2005-0056288 | | 6/2005 |
| KR | 20050056288 | * | 6/2005 |
| KR | 20050056288 a | * | 6/2005 |
| KR | 20030049208 a | * | 10/2005 |
| WO | WO 2009/140381 | | 11/2009 |

* cited by examiner

*Primary Examiner* — Randy Gulakowski
*Assistant Examiner* — Christina Wales
(74) *Attorney, Agent, or Firm* — McKenna Long & Aldridge LLP

(57) ABSTRACT

The present invention relates to a gas storage material comprising a novel mesoporous polymer, that shows superior gas storage efficiency and can stably adsorb and desorb gas, and method for gas storage using thereof.

The gas storage material comprises an acrylamide-based polymer.

7 Claims, 6 Drawing Sheets

GAS STORAGE MATERIAL AND METHOD FOR GAS STORAGE

This application is a National Stage Entry of International Application No. PCT/KR2011/006337, filed Aug. 26, 2011, and claims the benefit of Korean Application No. 10-2010-0107069 filed on Oct. 29, 2010, all of which are hereby incorporated by reference in their entirety for all purposes as if fully set forth herein.

TECHNICAL FIELD

The present invention relates to a novel gas storage material and method for gas storage. More particularly, the present invention relates to a gas storage material comprising a novel mesoporous polymer, that shows superior gas storage efficiency and can stably adsorb and desorb gas, and method for gas storage using thereof.

BACKGROUND ART

Recently, as international crude oil prices sharply rises, attention is focused on hydrogen energy as a promising substitute energy source.

The hydrogen energy can be obtained from water and is a clean energy that does not cause pollution. Thus, the hydrogen energy may be considered as a promising energy source which is substituted for fossil fuels such as oils and solves an energy crisis. In particular, the hydrogen, unlike the fossil fuels such as oils and natural gas, can generate energy without emission of carbon dioxide and be recycled into water after use as an energy source. Thus, the hydrogen energy is eco-friendly and is an energy source without concern of resources exhaustion.

For commercially applying the hydrogen as an energy source, it is necessary to develop and provide gas storage material or medium having superior gas storage efficiency for the hydrogen gas. In particular, the gas storage material should stably store gas, and effectively release the stored gas when use of the gas is needed.

Recently, there are some researches for various gas storage materials of the hydrogen or methane. These gas storage materials use natural porous inorganic materials such as zeolite or carbon nanotube; various metal-organic frameworks (MOFs) having pore structures; or metal or alloy hydrides such as $LiAlH_4$, $KBH_4$, $FeTiH_2$, $Mg_2NiH_4$, $MgH_2$ or $LaNi_5H_6$. However, most of the conventional gas storage materials can not have sufficient gas storage efficiency. Further, even a few metal-organic composites having sufficient gas storage efficiency cannot maintain stable gas storage state, or cannot properly release the stored gas when needed [Nature 1999, 398, 796; Nature 2002, 416; Science 2004, 306 1021; Acc. Chem. Res. 2002, 35, 972; WO09/011,545; WO06/110740; WO09/010,945; US Pat. Application 20100015026; WO01/78886; *J. Colloid & Interface Science*, 2008, 318, 42; *Nature* 2001, 414, 353; *Angew. Chem. Int'l.* 2006, 45, 7358; *J. Am. Chem. Soc.* 2008, 130, 7848; *CARBON*, 2009, 47, 3346; *International Journal of Hydrogen Energy*, 2010, 35, 225; *Chem. Rev.* 2007, 107, 4111; US Patent Application #20020034471; J. Korean Ind. Eng. Chem., 2009, 20(5), 465; US department of energy (DOE), DOE Hydrogen Program, FY, Program Review, 2004].

Disclosure

Technical Problem

Accordingly, the present invention provides a gas storage material that shows superior storage efficiency for gas such as hydrogen ($H_2$), and that can stably adsorb and desorb gas, and method for gas storage using thereof.

Technical Solution

The present invention provides a gas storage material comprising a novel acrylamide-based polymer comprising at least one repeating unit represented by Chemical Formula 1:

[Chemical Formula 1]

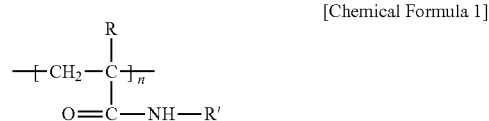

In Chemical Formula 1,
n is an integer of 15 to 1,800,
R is hydrogen or methyl; and
R' is X,

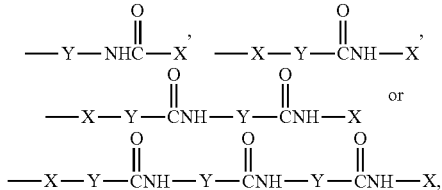

wherein X is —Z—R"; Y is alkylene having 1 to 10 carbon atoms; Z is arylene having 6 to 20 carbon atoms; and R" is a linear or branched hydrocarbon having 10 to 20 carbon atoms, or a linear or branched perfluorohydrocarbon having 10 to 20 carbon atoms In addition, the present invention provides a method for gas storage comprising the step of contacting and adsorbing a target gas onto the gas storage material of the present invention.

Hereinafter, the gas storage material and the method for gas storage according to the embodiment of the invention are described in more detail.

According to an embodiment of the invention, a gas storage material comprising a novel acrylamide-based polymer comprising at least one repeating unit represented by Chemical Formula 1 is provided:

[Chemical Formula 1]

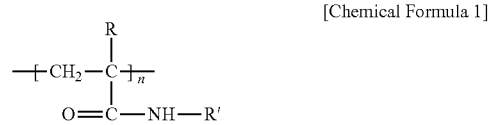

In Chemical Formula 1,
n is an integer of 15 to 1,800,
R is hydrogen or methyl; and R' is X,

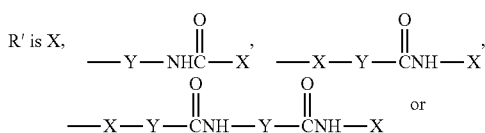

-continued

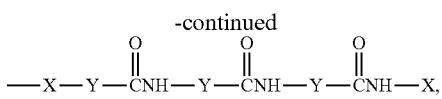

wherein X is —Z—R"; Y is alkylene having 1 to 10 carbon atoms; Z is arylene having 6 to 20 carbon atoms; and R" is a linear or branched hydrocarbon having 10 to 20 carbon atoms, or a linear or branched perfluorohydrocarbon having 10 to 20 carbon atoms.

The present inventors found that a gas storage material comprising the specific acrylamide-based polymer shows superior storage efficiency for gas such as hydrogen ($H_2$), and completed the present invention. In particular, as supported in the following examples, the acrylamide-based polymer can store very large amount of about 0.05 to 5.0 wt % of gaseous hydrogen ($H_2$) per 1 g of the polymer, when the gaseous hydrogen ($H_2$) is supplied with an initial pressure of about 26532 torr and is contacted with the polymer. Further, such a high gas storage efficiency of the polymer seems to be maintained at a temperature of about −200 to 25° C. and a pressure of about 1 to 100 atm. Thus, the gas storage material comprising the polymer can be preferably used for storage of gas such as hydrogen ($H_2$).

Further, the polymer and the gas storage material comprising thereof can stably adsorb and store the gas, and effectively desorb and release the adsorbed gas when needed. Accordingly, the gas storage material according to an embodiment of the invention can solve the problems of conventional gas storage materials and be preferably used for storage of gas such as hydrogen ($H_2$).

The reasons that the polymer and the gas storage material show superior storage efficiency as well as stable gas-storage and -release property presumably lie in the characteristic structure of the specific acrylamide-based polymer. The acrylamide-based polymer is prepared by an acrylamide-based monomer (hereinafter, the monomer of the following formula 2) through specific radical polymerization, for example RAFT polymerization, and the polymer can be a mesoporous polymer having a plurality of mesopores without additional chemical treating step.

The acrylamide-based monomer has a chemical structure that contains a self-assembling non-polar aliphatic hydrocarbon (having more than 10 carbon atoms), an arylene group causing π-π orbital interactions and an amide group causing intermolecular or intramolecular hydrogen bonding. Through the self-assembling behavior of the long-chain aliphatic hydrocarbon, π-π orbital interactions of the arylene groups and intramolecular hydrogen bonding of the amide groups, the monomer can form a regular monoclinic crystal structure in solid state.

As the specific radical polymerization is carried out on the monomer, a leaving radical polymerization occurs with the monomer molecules well-oriented, and thereby the individual monomer molecules are regularly arranged in the polymer chain. More specifically, the monomer molecules well-oriented through the polymerization combine together to form a polymer chain (i.e., one polymer building block), and these polymer building blocks aggregate to form a regularly arranged polymer. Due to the regular arrangement of the polymer building blocks in the polymer, the acrylamide-based polymer can include a large number of mesopores having a uniform pore size without a separate treatment after the polymerization reaction. For the same reason, the acrylamide-based polymer can exhibit crystallinity.

As the acrylamide-based polymer includes a large number of mesopores having a uniform pore size, and thereby has mesoporosity and crystallinity, the polymer and the gas storage material can adsorb and store the gas such as hydrogen ($H_2$) in the mesopores with a high efficiency and stability. Also, due to the properties such as the mesoporosity, the gas storage material can effectively desorb and release the adsorbed gas when needed. Thus, the polymer and the gas storage material can be preferably used for storage of gas such as gaseous hydrogen ($H_2$), methane ($CH_4$) or carbon dioxide ($CO_2$).

Hereinafter, the acrylamide-based polymer and the gas storage material comprising the polymer will be described in more detail.

In the acrylamide-based polymer used for gas storage material as a main component, Z is C6 to C20 arylene, and more specifically, can be

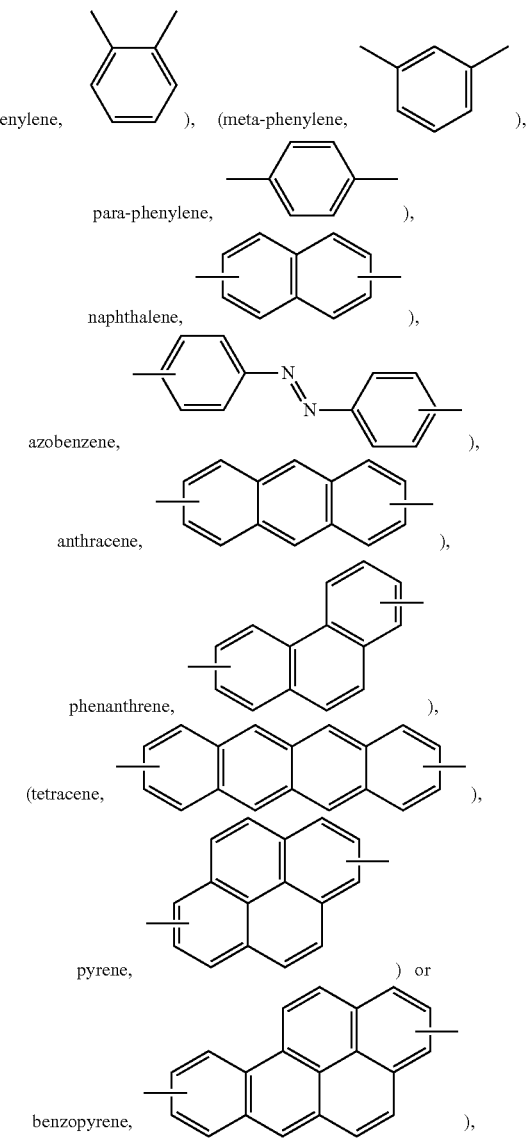

and the like.

R" is a linear or branched hydrocarbon substituted at the ortho-, meta- or para-position of the aromatic ring in Z, and the hydrocarbon has a long chain containing at least 10 carbon atoms, more specifically, 10 to 20 carbon atoms. Also, the hydrocarbon of R" may be substituted with Fluorine and be a linear or branched perfluorohydrocarbon having 10 to 20 carbon atoms.

The repeating unit of the above formula 1 and the monomer of the formula 2 given below have such a long-chain hydrocarbon and arylene, so the polymer more prominently exhibits such features as mesoporosity and crystallinity.

The polymer may be a homopolymer consisting of one repeating unit of formula 1, or a copolymer comprising at least two repeating units of formula 1.

The acrylamide-based mesoporous polymer includes a large number of pores having a diameter of about 2.0 to 10.0 nm, preferably about 2.0 to 6.0 nm, in the solid state. The term "diameter" of the pore as used herein is defined as the length of the longest straight line between two points on the circle, oval or polygon that is the cross-section in each pore. The polymer includes a large number of uniform pores in such a diameter range, and hence the gas storage material can show superior property such as gas storage efficiency.

The polymer has a number-average molecular weight of about 5000 to 500000, preferably about 7000 to 300000. The polymer is a crystalline polymer having a melting point ($T_m$) of about 200 to 300° C., preferably about 220 to 280° C. Due to the melting point and the molecular weight in the ranges, the polymer can be excellent in thermal stability pertaining to high melting point and high molecular weight, easily produced in an electrospun fiber form simply by electrospinning or the like, and also maintaining its excellent mechanical properties such as strength.

From the structural analysis on the solid polymer using SAXS (Small Angle X-ray Scattering) and WAXS (Wide Angle X-ray Scattering), and the thermal analysis on the phase-transition temperature of the polymer by DSC (Differential Scanning calorimetry), the inventors of the present invention found out that the acrylamide-based polymer may be a crystalline polymer having a melting point in the abovementioned range. Unlike the conventional polymers of up-to-date known similar structures, the polymer has mesoporosity and crystallinity. Due to the property such as the mesoporosity, the polymer and the gas storage material can adsorb and store gas such as hydrogen with very high storage efficiency.

The inventors of the present invention also found out that the pore diameter on the polymer decreased with an increase in the annealing temperature during an annealing which was carried out on the polymer in the temperature range of at least about 200° C. and below the melting temperature, for example, between about 220° C. and 240° C. As the annealing temperature increased, the pore diameter decreased by about 0.4 to 0.7 nm, more specifically, by about 0.5 to 0.6 nm.

It was also revealed that the pore diameter on the polymer increased with a change in the chemical structure of R' bonded to the amide (—CO—NH—) group in the repeating unit of formula 1, or with an increase in the length of the aliphatic hydrocarbon bonded to the end of R', i.e., an increase in the number of carbon atoms of R". For example, the pore diameter increased by about 0.1 to 1.0 nm, more specifically, by about 0.2 to 0.7 nm as the number of carbon atoms increased from 12 to 16. The pore diameter also increased as the chemical structure of Z in R' changed from phenylene into another different aromatic structure such as naphthalene or anthracene.

The reason of the change in the pore diameter presumably lies in that the mesoporous three-dimensional structure (or, crystal structure) of the polymer changes by annealing process, by the changed chemical structure of R' bonded to the amide group, or by a change in the number of carbon atoms of R" bonded to the end of R'. This can be supported by the results of the DSC thermal analysis.

The pore size of the acrylamide-based polymer can be controlled easily by heat treatment, modification of functional group or the adjustment of hydrocarbon chain length in amide group of the repeating unit. Also, the pore size of the gas storage material comprising the polymer can be controlled easily. Thus, the gas storage material can have the controlled porosity and gas storage ability according to the kind of a target gas or a required level of the gas storage and adsorption property, and is preferably used for storage of gas such as hydrogen ($H_2$) in the various fields.

Meanwhile, the acrylamide-based polymer can be included in the form of an electrospun fiber comprising the polymer, as well as in the form of a solid polymer powder, in the gas storage material. The electrospun fiber, similarly to the polymer, shows a porosity including a plurality of uniform minute pores on the surface. Furthermore, the process of electro-spinning the mesoporous polymer can make the pore size formed on the surface be larger and increase the porosity.

In addition, since the electrospun fiber is in the form of a fiber having an uniform diameter, it has very large surface area compared to the solid polymer powder. Thus, the gas storage material comprising the polymer in the form of the electrospun fiber can show remarkably increased storage efficiency for gas such as hydrogen. For example, the storage efficiency of the gas storage material comprising the electrospun fiber may be at least about 5 times higher than the gas storage material comprising the solid polymer powder.

The electrospun fiber has a diameter of about 200 nm to 10 μm, and preferably about 250 nm to 7 μm. The term "diameter" of electrospun fiber as used herein is defined as the length of the longest straight line between two points on the circle, oval or polygon that is the cross-section in each fiber. The diameter of electrospun fiber can be controlled by the condition of electro-spinning, or the kinds of repeating unit and molecular weight of polymer. The electrospun fiber has various diameters within the ranges. Through the control of the scale of the electrospun fiber, the electrospun fiber and the gas storage material comprising thereof can have the controlled surface area and gas storage ability, and is suitably used for storage of gas such as hydrogen ($H_2$) in the various fields.

A plurality of pores on the surface of the electrospun fiber can be formed in a diameter of about 20 to 500 nm, preferably about 50 to 450 nm, and more preferably about 100 to 400 nm, and the pore can be distributed uniformly on the surface of fiber.

As described above, the porosity of the electrospun fiber is derived from the mesoporosity of acrylamide-based polymer, and increases more in the electro-spinning process, thereby providing the fiber with the plurality of uniform pore having the range of pore size. Due to the increased porosity of the electrospun fiber, the gas storage material comprising the fiber can show more improved gas storage efficiency.

Meanwhile, the acrylamide-based polymer and the electrospun fiber can be prepared by a method as described in the following.

Firstly, the acrylamide-based polymer can be prepared by performing the RAFT polymerization for the reactants containing at least one monomer represented by Chemical Formula 2, in the presence of radical initiator, and optionally the RAFT (reverse addition fragmentation transfer) agent; and precipitating the polymerization product in non-solvent:

[Chemical Formula 2]

$$\begin{array}{c} R \\ | \\ CH2=C \\ | \\ O=C-NH-R' \end{array}$$

wherein R and R' are as defined above.

The acrylamide-based monomer having a specified chemical structure of formula 2 is subjected to RAFT polymerization under specified conditions and then to precipitation in a nonsolvent to easily form the acrylamide-based mesoporous polymer having mesoporosity and crystallinity. The reason that the polymer prepared by this method has mesoporosity and crystallinity is already described enough and will not be mentioned hereinafter in any further detail.

It is therefore possible to prepare the acrylamide-based polymer having a large number of pores merely by a polymerization process alone without any other separate chemical treatment.

The preparation method may further comprise, prior to the polymerization step, preparing a reaction solution including the radical initiator, the RAFT agent, and the reactant; adding the reaction solution in a polymerization ampoule and eliminating oxygen by a freeze-thaw method; and sealing the ampoule. In this manner that the individual reactants and the initiator are added in the oxygen-free polymerization ampoule and then subjected to polymerization, the RAFT polymerization well-known as a kind of leaving radical polymerization takes place more adequately to form the acrylamide-based mesoporous polymer with a high polymerization conversion.

The preparation method may further comprise, after the precipitation step, dissolving the precipitated polymer product in an organic solvent; and re-precipitating the polymer product solution with a nonsolvent. The addition of the re-precipitation step helps the preparation of the acrylamide-based mesoporous polymer having crystallinity in a more preferable way.

In the preparation method, the monomer is any acrylamide-based monomer of formula 2 and may include, for example, N-(p-dodecyl)phenyl acrylamide (DOPAM), N-(p-tetradecyl)phenyl acrylamide (TEPAM), N-(p-hexadecyl)phenyl acrylamide (HEPAM), N-(p-dodecyl)naphthyl acrylamide (DONAM), N-(p-tetradecyl)naphthyl acrylamide (TENAM), N-(p-hexadecyl)naphthyl acrylamide (HENAM), N-(p-dodecyl)azobenzenyl acrylamide (DOAZAM), N-(-p-tetradecyl)azobenzenyl acrylamide (TEAZAM), N-(p-hexadecyl)azobenzenyl acrylamide (HEAZAM), or N-[4-(3-(5-(4-dodecyl-phenylcarbamoyl)pentyl-carbamoyl)-propyl) phenyl acrylamide (DOPPPAM). Of course, the monomer may be a mixture of at least two of those listed monomers.

The monomer may be a monoclinic crystal structure, preferably in the form of monoclinic single crystal, which can be supported by the following examples. As the monomer is obtained in the form of monoclinic single crystal and then subjected to RAFT polymerization to prepare a polymer, the individual monomer molecules in the polymer chain are more regularly arranged and better oriented to combine together and thereby more preferably form the polymer having mesoporosity and crystallinity.

To obtain the monomer in the form of single crystal, a crystal growth agent is added in a polar solvent and/or a nonpolar solvent after the synthesis of the monomer, to grow single crystals. The growth rate of the single crystal depends on the crystal growth time and temperature, or the chemical structure and concentration of the added crystal growth agent (e.g., seed crystal).

The radical initiator, the RAFT agent, and the monomer are dissolved in an organic solvent to prepare a reaction solution, and RAFT polymerization takes place in the reaction solution. The organic solvent as used herein includes at least one non-polar solvent selected from the group consisting of n-hexane, cyclohexane, benzene, toluene, chlorobenzene, dichlorobenzene, methylene chloride, or 1,2-dichloroethane; or at least one polar solvent selected from the group consisting of acetone, chloroform, tetrahydrofuran (THF), dioxane, monoglyme, diglyme, dimethylformamide (DMF), dimethylsulfoxide (DMSO), or dimethylacetamide (DMAC). The organic solvent may also be a mixture of the non-polar and polar solvents. The organic solvent can also be used in the re-precipitation step to dissolve the polymer product.

In the reaction solution, the monomer is dissolved in the organic solvent at a concentration of about 3.0 to 50 wt %, preferably about 5.0 to 40 wt % with respect to the weight of the organic solvent. The reaction solution in this concentration range makes the subsequent polymerization process work out in an efficient way.

The radical initiator used along with the monomer may be any known initiator for radical polymerization without limitation, including any one selected from the group consisting of azobisisobutyronitrile (AIBN), 2,2'-azobis-2,4-dimethylvaleronitrile, benzoyl peroxide (BPO), or di-t-butyl peroxide (DTBP); and at least two selected from the group of radical initiators.

The RAFT agent as used herein includes any thermal decomposition initiator such as S-1-dodecyl-S'-(α,α'-dimethyl-α"-acetic acid)trithiocarbonate, cyanoisopropyl dithiobenzoate, cumyldithiobenzoate, cumylphenylthioacetate, 1-phenylethyl-1-phenyldithioacetate, or 4-cyano-4-(thiobenzoylthio)-N-succinimide valerate. The RAFT agent may also be a mixture of at least two of the above-listed initiators.

The radical initiator and the RAFT agent are used at a concentration of about 0.001 to 5.0 wt % with respect to the weight of the monomer.

In the above-described preparation method, the RAFT polymerization step is carried out at a reaction temperature of about 60 to 140° C., for about 30 to 200 hours, more specifically, about 50 to 170 hours.

In the precipitation or re-precipitation step of the preparation method, the nonsolvent is a solvent that does not dissolve the product of the polymerization process or the acrylamide-based polymer. The examples of the nonsolvent may include a polar solvent such as methanol, ethanol, n-propanol, isopropanol, or ethyleneglycol; or a non-polar solvent such as n-hexane, cyclohexane, or n-heptane. Of course, the nonsolvent may also be a mixture of at least two of the above-listed solvents. The precipitation and re-precipitation processes using the nonsolvent facilitate the production of the polymer having mesoporosity and crystallinity with a high purity.

Further, the electrospun fiber comprising the polymer can be prepared by a method, the method comprising the steps of: dissolving the acrylamide-based polymer comprising at least one repeating unit represented by Chemical Formula 1 in an organic solvent to obtain a polymer solution: and performing electrospinning the polymer solution.

In this method, firstly, the acrylamide-based polymer prepared by the above method is dissolved in an organic solution to produce the polymer solution to be used for electro-spinning.

The solvent used for dissolving the polymer can be any being capable of dissolving the polymer. For examples, the solvent may comprise at least one nonpolar solvent selected from the group consisting of n-hexane, cyclohexane, benzene, toluene, chlorobenzene, dichlorobenzene, methylenechloride and 1,-dichloroethan; or at least one polar solvent selected from the group consisting of acetone, chloroform, tetrahydrofuran (THF), dioxane, monoglyme, diglyme, dimethylformamide (DMF), dimethylsulphoxide (DMSO) and dimethylacetamide (DMAC). A mixed solvent including at least two solvents selected from the non-polar solvents or polar solvents, or a mixed solvent including the non-polar solvent and the polar solvent can be used. When the mixed solvent is used, the polar solvent is preferably contained in an amount of about 60-90 wt % based on the total mixed solvent. In the polymer solution, the polymer is preferably dissolved in the solvent at an amount of about 10 to 40 wt %.

The kind and concentration of the solvent can be selected depending on the chemical structure and molecular weight of the acrylamide-based polymer.

After preparing the polymer solution, the electrospun fiber can be formed by carrying out the electro-spinning the solution. The chemical or physical properties of the electrospun fiber can be affected by the molecular structure, morphological structure and molecular weight of used polymer, the kind and concentration of solvent, the spinning speed (mL/min) of polymer solution, voltage applied for the electro-spinning device, the diameter of spinning needle, the distance between the needle and fiber collector and the like.

In these aspects, to prepare the electrospun fiber having more uniform pore size and diameter, the electro-spinning may be carried out by applying about 10 to 30 kV preferably. The electro-spinning device includes a nozzle with a diameter of about 20 to 30 gauge where the distance between nozzle and the collector is preferably about 10 to 20 cm.

In addition, the spinning speed may be dependent on the kind and molecular weight of polymer, and the kind and concentration of solvent, and for example, the spinning speed may be preferably about 5 to 20 mL/min, in order to prepare the uniform electrospun fiber that shows the properties and does not form bead.

According to the method, the electrospun fiber having the porosity and large surface area can be prepared, and the gas storage material according to an embodiment of the invention can be provided using the electrospun fiber.

Meanwhile, the gas storage material according to an embodiment of the invention can be prepared and provided according to generally known compositions and methods of the conventional gas storage material, except that it comprises the specific acrylamide-based polymer or electrospun fiber. In addition, the gas storage material may further comprise various gas storage components or other components that has been generally used in the art. The kinds of the components are obviously known to any ordinary skilled person in the art. Further, the polymer or the electrospun fiber in the gas storage material can be modified by other components with the proviso that the polymer and the electrospun maintain their porosity and superior gas storage ability.

Also, the gas storage material can be used for storage of various gases, for example, gaseous hydrogen ($H_2$), methane ($CH_4$) or carbon dioxide ($CO_2$), and so like.

Further, the gas storage material may be used according to a general method for gas storage. The method may comprise the step of: supplying a target gas such as hydrogen with a given pressure; and contacting and adsorbing the target gas onto the gas storage material. By this method, the target gas can be adsorbed and stored on the gas storage material. The gas storage material can maintain a stable adsorption and storage state for gas such as hydrogen at a certain temperature, and effectively desorb and release the adsorbed gas at a reduced pressure when the use of the gas is needed.

Advantageous Effects

As described above, the present invention provides a gas storage material showing improved storage efficiency for gas such as hydrogen, compared to conventional gas storage materials. The gas storage material can stably store the gas, and effectively release the gas when the use of the gas is needed.

The superior properties of the gas storage material seem to result from the properties such as porosity of novel acrylamide-based polymer and electrospun fiber comprising the polymer. The gas storage material can be preferably used for storage of gas such as hydrogen, and largely contribute the effective use of the clean energy source of the hydrogen energy.

MODE OF INVENTION

Figure 1:
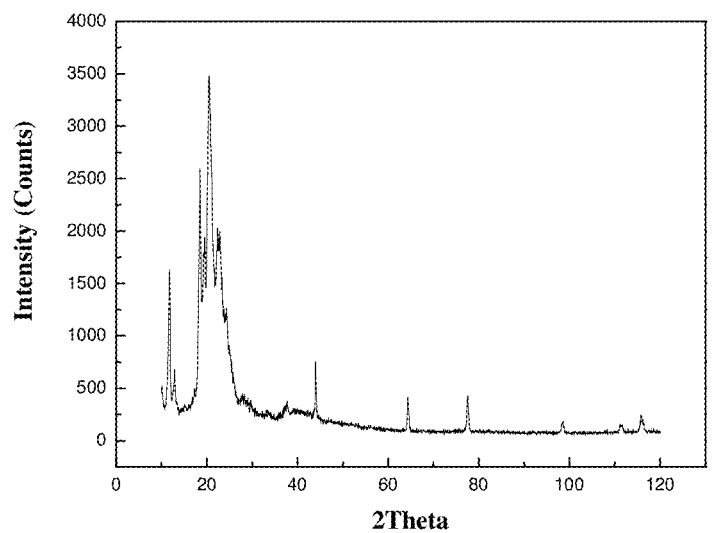
FIG. 1 shows the X-ray diffraction pattern of a DOPPPAM crystal obtained in Example 3.

In the following are set forth specific examples according to the invention, describing the function and effect of the invention in further detail. It is to be understood that the examples are only for illustrative purposes and are not intended to limit the scope of the invention.

Examples 1, 2 and 3

Synthesis of Acrylamide-Based Monomer and Determination of Crystallinity

Example 1

Synthesis of p-Dodecylphenylacrylamide (DOPAM) and Preparation of Single Crystal Firstly, p-dodecylaniline (12 g, 0.046 mol) was dissolved in THF solvent (100 mL). The solution was poured into a 100 mL three-mouthed round flask, and an acid eliminator was added dropwise through a funnel for 10 minutes, where the acid eliminator contained imidazole and triethyl amine at the same mole fraction (0.023 mol). Under the nitrogen atmosphere, a solution containing acryloyl chloride (3.8 mL, 0.047 mol) in THF (20 mL) was gradually added dropwise to the mixed solution through a dropping funnel for 20 minutes.

Meanwhile, the solution was cooled on ice bath to prevent the temperature of the reaction mixture from rising above 5° C. After 6 hours of reaction at 0° C., the solution was kept at 25° C. for more 9 hours of reaction. Upon completion of the reaction, the solution was passed through a filter paper to eliminate precipitated salts, and the solvent was evaporated from the filtrate on an evaporator. The solid thus obtained was dissolved in dichloromethane (100 mL) and added to a separatory funnel along with 10% aqueous $NaHCO_3$ solution (50 mL). The funnel was shaken vigorously and set aside to allow for the complete separation of the aqueous phase and thereby to remove unreacted acryloyl chloride. Magnesium sulfate (1.0 g) was added to the separated dichloromethane solution. After stirred for 5 hours, the solution was subjected to filtration to remove a trace amount of water dissolved in the solvent. The dichloromethane solution thus obtained was kept on the evaporator, and n-hexane (100 mL) was added. The solution was stirred for 2 hours, and unreacted p-dodecyl aniline was filtered out from the solution. The filtrate was then removed of the solvent on the evaporator to yield a white solid DOPAM product (yield 95%). The chemical structure of the DOPAM product was identified by hydrogen nuclear magnetic resonance ($^1$H-NMR) spectrum. The results were as follows.

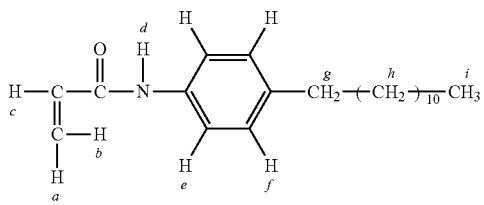

$^1$H-NMR ($CDCl_3$): e, 7.5(d, 2H); d, 7.2(s, 1H); f, 7.15(d, 2H); b, 6.4(d, 1H); c, 6.2(q, 1H); b, 5.8(d, 1H); g, 2.6(t, 2H); h, 1.25-1.35(m, 20H); i, 0.935(t, 3H).

The DOPAM product ($T_m$=101° C.) was purified by recrystallization with ethanol three times. The purified DOPAM was added to THF solvent, an several drops of a non-polar solvent was added. The solution was kept below −10° C. for a defined period of time to grow single crystals of the monomer.

It turned out that the growth rate of the single crystals was dependent on the composition and proportion of polar and non-polar solvents, crystal growth time and temperature, and the structure and concentration of the crystal growth agent added.

XRD (X-Ray Diffractometry) was used to identify the crystal structure of the single crystals obtained in Example 1. The crystallographic data thus obtained is presented in Table 1, which shows that the single crystals of the monomer of Example 1 have a monoclinic crystal structure.

TABLE 1

| Crystallographic Data for Single Crystals of Monomer of Example 1 | |
|---|---|
| Empirical Formula | $C_{21}H_{33}N_1O_1$ |
| Formula weight | 315.48 |
| Temperature [K] | 293(2) K |
| Wavelength [Å] | 0.71073 |
| Crystal system, space group | Monoclinic, $P2_1/c$ |
| a [Å] | 4.7055 (13) |
| b [Å] | 43.315 (16) |
| c [Å] | 9.4150 (19) |
| β [°] | 95.158 (19) |
| Volume [Å$^3$] | 1911.2 (10) |
| $d_{calcd}$ [gcm$^{-3}$] | 1.096 |
| μ [mm$^{-1}$] | 0.066 |

TABLE 1-continued

| Crystallographic Data for Single Crystals of Monomer of Example 1 | |
|---|---|
| F(000) | 696 |
| Crystal size [mm] | 0.55 × 0.30 × 0.25 |
| θ Range [°] | 1.88-26.33 |
| Data/parameters | 1845/213 |
| GOF on F$^2$ | 1.111 |
| R1, wR2 [I > 2σ(I)] | 0.0975, 0.2551 |
| Largest diff. peak and hole [e · Å$^{-3}$] | 0.358 and −0.343 |

Example 2

Synthesis of p-Tetradecylphenylacrylamide (TEPAM) and p-hexadecylphenylacrylamide (HEPAM) and Preparation of Single Crystal TEPAM and HEPAM were synthesized with the yields of 90% and 93%, respectively in the same manner as described in Example 1, excepting that p-tetradecylaniline having 14 carbon atoms or p-hexadecylaniline having 16 carbon atoms was used instead of p-dodecylaniline having 12 carbon atoms. The single crystals of TEPAM and HEPAM were grown and identified through XRD analysis technique in the same manner as described in Example 1, revealing that the single crystals had a monoclinic crystal structure.

Example 3

Synthesis of N-[4-(3-(5-(4-dodecyl-phenylcarbamoyl)pentyl-carbamoyl)-propyl)phenyl acrylamide (DOPPPAM) and Preparation of Single Crystal 4-(4-aminophenyl)butyric acid (6 g, 3.36 mmol) was added to a 200 mL three-mouthed round flask, and methylene chloride (100 mL) was added and dissolved under the nitrogen atmosphere at 40° C. To the solution was added chlorotrimethyl silane (6.0 mL). The solution was refluxed and agitated for 2 hours and, after reaction, cooled down to the room temperature. While kept at 0 to 5° C. on an ice bath under the nitrogen atmosphere, an acid eliminator (in an excess amount by 10% in concentration relative to the reactant) was added dropwise through a funnel for 10 minutes, where the acid eliminator contained imidazole and tetraethyl amine mixed at the same mole fraction. In the same manner, a solution containing acryloyl chloride (2.8 mL) in methylene chloride (30 mL) was added dropwise for 20 minutes, and the solution was kept for 30 minutes of reaction and then warmed up to the room temperature for 2 more hours of reaction. After the solvent was removed, 2M sodium hydroxide solution (200 mL) was added, and the solution was stirred for 2 hours. The aqueous solution was weak-acidified (pH 5~6) with a 2M hydrogen chloride solution to form an aqueous solution containing a white precipitate. This solution was added to a separatory funnel along with ethylacetate (200 mL) and shaken up to cause phase separation into aqueous and ethylacetate layers. The solvent in the ethylacetate layer where the product is dissolved was removed on an evaporator, and the residual solid was dried out in a vacuum oven for 24 hours to yield a white 4-(4-acrylaminophenyl)butyric acid (APB) solid (yield 92%). The melting point of the solid was 107° C.

Subsequently, N-(t-butylester)caproic acid (6.0 g, 25.1 mmol) and 4-dodecylamine (5.1 g) were added to a 500 mL three-mouthed round flask, and THF (300 mL) was added and dissolved at 0~5° C. on an ice bath under the nitrogen atmosphere. DMAP (1.59 g, 12.9 mmol) was added as a catalyst, and the solution was stirred for 10 minutes. EDC (5.98 g, 31.2 mmol) was added as a moisture remover, and the solution was stirred for one hour and then 18 more hours at the room temperature. After the reaction, the solution was precipitated in distilled water (1200 mL) and stirred for one hour. The residual substances, such as DMAP, EDC, EDC urea salt and THF were filtered out, and a reactant-product mixture was then extracted. An aqueous NaHCO$_3$ solution (200 mL) was added three times to the extracted mixture, and the solution was stirred for one hour and removed of unreacted N-(t-butylester)caproic acid through filtration. To the solid obtained was added n-hexane (600 mL), and the solution was stirred for one hour and removed of unreacted 4-dodecylaniline through filtration. The residual solid was dried out in a vacuum oven for 24 hours to yield a white 5-(4-dodecylphenyl-carbamoyl)pentyl)-carbamic acid t-butyl ester solid (yield 91%).

The solid product, 5-(4-dodecylphenyl-carbamoyl)pentyl)-carbamic acid t-butyl ester (6.0 g, 12.6 mmol) was added to a one-mouthed round flask, and methylene chloride (150 mL) was added and dissolved at the room temperature. Trifluoroacetic acid (18.9 mL, 2.52 mol) was added, and the solution was stirred for 2 hours and removed of the solvent. Ethylether (90 mL) was added, and the solution was stirred for 30 minutes and then removed of unreacted 5-(4-dodecylphenyl-carbamoyl)pentyl)-carbamic acid t-butyl ester through filtration. The residual solid was dried out in a vacuum oven for 24 hours to yield a white 5-(4-dodecylphenyl-carbamoyl)pentyl)-amine solid (yield 97%).

The above 5-(4-dodecylphenyl-carbamoyl)pentyl)-amine solid (3.0 g, 7.9 mmol) and the APB solid (1.86 g) previously obtained were added to a 500 mL three-mouthed round flask, and THF (150 mL) was added and dissolved at 0~5° C. on an ice bath under the nitrogen atmosphere. DMAP (1.95 g, 10.1 mmol) was added as a catalyst, and the solution was stirred for 10 minutes. EDC (1.831 g, 9.6 mmol) was added as a moisture remover, and the solution was stirred for one hour and then 18 more hours at the room temperature. After the reaction, the solution was precipitated in distilled water (600 mL) and stirred for one hour. The residual substances, such as DMAP, EDC, EDC urea salt and THF were filtered out, and a reactant-product mixture was then extracted. An aqueous NaHCO$_3$ solution (600 mL) was added to the extracted mixture, and the solution was stirred for one hour and removed of unreacted ABP through filtration. To the solid thus obtained was added ethanol (300 mL), and the solution was stirred for one hour and removed of unreacted 5-(4-dodecylphenyl-carbamoyl)pentyl)-amine through filtration. The residual solid was dried out in a vacuum oven for 24 hours to yield a white DOPPPAM solid (yield 89%, melting point 174° C.).

The DOPPPAM thus obtained was dissolved in THF solvent, and several drops of a non-polar solvent were added. To the solution was added a trace of a crystal growth agent to cause crystal growth at a low temperature below -10° C. for a defined period of time, thereby producing pure needle-like DOPPPAM crystals. The chemical structure of the pure DOPPPAM was identified by hydrogen nuclear magnetic resonance ($^1$H-NMR) spectrum. The results were as follows. In addition, the crystallinity of the DOPPPAM having the needle-like crystal form was identified through XRD analysis technique.

$^1$H-NMR (DMSO-d6): 4, 10.06(s, 1H); 14, 9.76(s, 1H); 10, 7.78(m, 1H); 5, 7.59(m, 2H); 6, 7.23(m, 2H); 15, 7.12(d, 2H); 16, 7.08(d, 2H); 1, 6.42(q, 1H); 2, 6.24(d, 1H); 3, 5.72(d, 1H); 11, 3.01(m, 2H); 7, 2.26(m, 2H); 9, 2.06(m, 2H); 8, 1.78(m, 2H); 13, 1.55(m, 2H); 17, 1.52(m, 2H); 12, 1.40(m, 6H); 17, 1.23(m, 20H); 18, 0.85(t, 3H)

Figure 2:
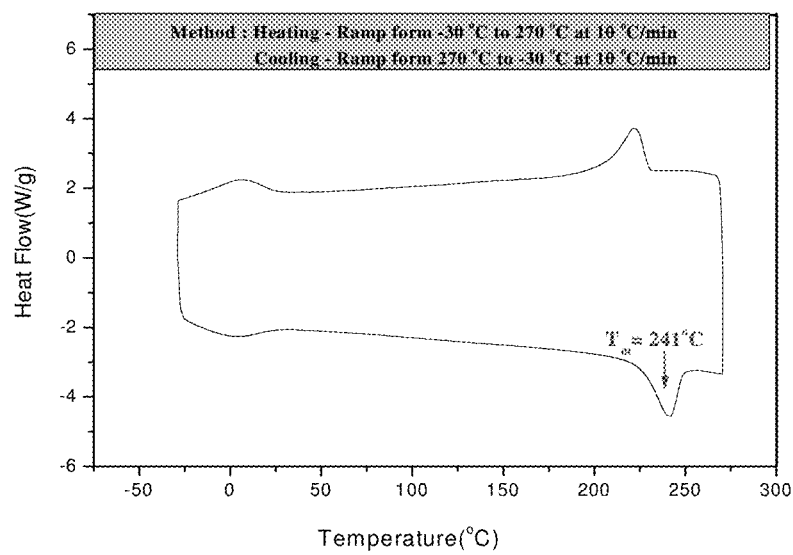
FIG. 2 shows the DSC thermal analysis curve of a polymer prepared in Example 4.

The XRD instrument was used to determine the crystallinity of the needle-like DOPPPAM crystals obtained in Example 3. The X-ray diffraction pattern of the crystals is shown in FIG. 2, which demonstrates that the DOPPPAM also had crystallinity. According to the X-ray diffraction pattern, the monomer of Example 3 also turned out to have a crystal structure in which the individual molecules were very well-arranged spatially in the solid state.

Examples 4-10

Preparation of Acrylamide-Based Mesoporous Polymer

Example 4

Preparation of Poly(DOPAM)-1

The DOPAM monomer (1.0 g) obtained the rod-like crystal form in Example 1 was dissolved in THF (6.3 mL) and poured in a 10 mL Schenk flask along with cyanoisopropyl dithiobenzoate (1.75 mg) as a RAFT agent and AIBN (0.87 mg) as a radical initiator. The solution was stirred under the nitrogen atmosphere for 30 minutes, removed of oxygen and kept in a silicon oil container at 70° C. to cause RAFT polymerization for 72 hours. After the polymerization reaction, the reaction solution was precipitated with methanol (200 mL) and then subjected to filtration to give an orange solid. The solid was dissolved in THF (8 mL) and re-precipitated with an excess of methanol. The light yellowish solid thus obtained was dried out in a vacuum oven for 24 hours to yield a pure homopolymer, Poly[DOPAM]-1 represented by Chemical Formula 3. The polymerization conversion and the number-average molecular weight were 48% and 14900, respectively. The homopolymer had a very narrow molecular weight distribution of 1.25 and a melting point ($T_m$) of 241° C.

[Chemical Formula 3]

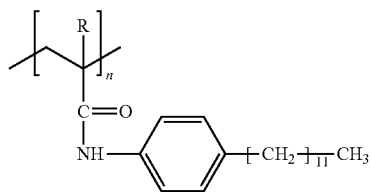

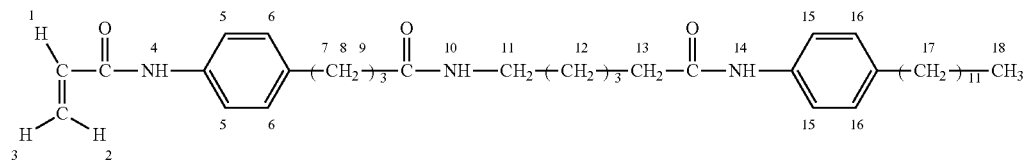

Example 5

Preparation of Poly(DOPAM)-2

The procedures were performed to obtain a pure Poly[DOPAM]-2 polymer in the same manner as described in Example 4, excepting that there were used the DOPAM monomer (1.5 g) obtained in the rod-like crystal form in Example 1, benzene (7.8 mL), cyanoisopropyl dithiobenzoate (2.63 mg) as a RAFT agent and AIBN (1.3 mg) as a radical initiator. The polymerization conversion and the number-average molecular weight were 66% and 35000, respectively. The polymer had a very narrow molecular weight distribution of 1.39 and a melting point ($T_m$) of 242° C.

Example 6

Preparation of Poly(DOPAM)-3

The DOPAM monomer (1.0 g) obtained in the rod-like crystal form in Example 1, mixture 6.5 mL of THF/benzene (mixing volume ratio of 30/70), and BPO (10 mg) as a radical initiator were poured in a 20 mL ampoule and then the oxygen of the solution was removed by freeze-thaw method. The ampoule was sealed and kept at 80° C. in an oven to cause RAFT polymerization for 48 hours. After the polymerization reaction, the reaction solution was precipitated with methanol (30 mL) and then subjected to filtration to give a light yellowish solid. The solid was dissolved in 10 mL of THF and reprecipitated with excess methanol. The solid was dried out in a vacuum oven for at least 24 hours to yield a pure homopolymer, Poly(DOPAM)-3. The polymerization conversion and the number-average molecular weight were 94% and 99000, respectively. The homopolymer had a molecular weight distribution of 3.2 and a melting point ($T_m$) of 242° C.

Example 7

Preparation of Poly(DOPAM)-4

The procedures were performed to obtain a pure Poly[DOPAM]-4 polymer in the same manner as described in Example 6, excepting that there were used the DOPAM monomer (1.0 g) obtained in the rod-like crystal form in Example 1, benzene (6.5 mL), BPO (10 mg) as a radical initiator and polymerization time of 72 hours. The polymerization conversion and the number-average molecular weight were 97% and 115000, respectively. The polymer had a very narrow molecular weight distribution of 3.4 and a melting point ($T_m$) of 242° C.

Example 8

Preparation of Poly(TEPAM)

The procedures were performed to obtain a pure Poly[TEPAM] polymer represented by Chemical Formula 4 in the same manner as described in Example 7, excepting that there was used the TEPAM monomer (1.0 g) obtained in the rod-like crystal form in Example 2. The polymerization conversion rate and the number-average molecular weight were 93% and 119100, respectively. The Poly[TEPAM] homopolymer had a very narrow molecular weight distribution of 2.7 and a melting point ($T_m$) of 242° C.

[Chemical Formula 4]

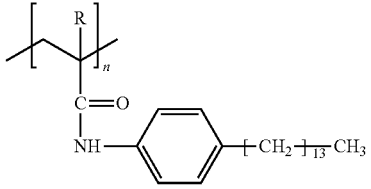

Example 9

Preparation of Poly(HEPAM)

The procedures were performed to obtain Poly[HEPAM] represented by Chemical Formula 5 in the same manner as described in Example 7, excepting that there was used the HEPAM monomer (1.0 g) obtained in the rod-like crystal form in Example 2. The polymerization conversion rate and the number-average molecular weight were 86% and 61200, respectively. The Poly[HEPAM] homopolymer had a very narrow molecular weight distribution of 2.4 and a melting point ($T_m$) of 241° C.

[Chemical Formula 5]

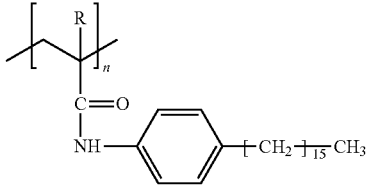

Example 10

Preparation of Poly(DOPPPAM)

The procedures were performed to obtain a light yellowish homopolymer, Poly[DOPPPAM] represented by Chemical Formula 6 in the same manner as described in Example 7, excepting that there were used the DOPPPAM monomer (1.0 g) obtained in the needle-like crystal form in Example 3, DMF (4.22 mL), and DTBP (0.002 mL) as a radical initiator and that polymerization was carried out at 110° C. (polymerization temperature) for 96 hours (polymerization time). The polymerization conversion rate and the number-average molecular weight were 86% and 39200, respectively. The Poly[DOPPPAM] homopolymer had a very narrow molecular weight distribution of 2.9 and a melting point ($T_m$) of 256° C.

[Chemical Formula 6]

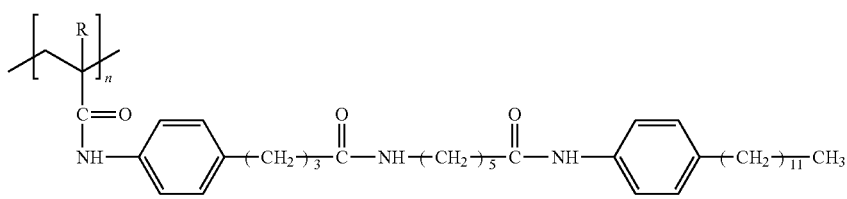

Experimental Example 1

Analysis on Thermal Properties and Solid Structure of Acrylamide-Based Porous Polymer (1) Analysis on Thermal Properties of Polymer by DSC A DSC thermoanalytical instrument was used to examine the phase transition behavior of the Poly(DOPAM), Poly(TEPAM) and Poly(HEPAM) polymers prepared in Examples 4, 8 and 9, respectively. Through the DSC thermoanalysis, the three polymers turned out to be crystalline polymers with melting temperatures ($T_m$) of 241, 237 and 229° C., respectively. The melting temperature ($T_m$) of the polymers had a tendency to lower gradually with an increase in the number of carbon atoms of the aliphatic hydrocarbon introduced at the end in order of 12, 14 and 16. The Poly(DOPPPAM) polymers of Examples 10 of a different chemical structure also turned out to be a crystalline polymer having a melting temperature ($T_m$) of 256° C.

FIG. 2 is a DSC thermal analysis curve showing the behavior of the phase transition temperature of Poly(DOPAM)-1 obtained in Example 4. Referring to FIG. 2, the melting temperature ($T_m$) of the mesoporous structure formed by the polymer chain of the Poly(DOPAM) polymer was 241° C. The melting temperatures ($T_m$) of the minute crystals formed from the aliphatic hydrocarbon introduced at the end of the repeating unit were about 5° C. As the phase transition melting temperatures appeared in the almost same temperature range on both heating and cooling curves with the same heat capacity, the porous structure formed among the polymer chains of the Poly(DOPAM) polymer was presumably oriented in a relatively stable way. There was no significant difference in the melting temperature ($T_m$) when the Poly(DOPAM) polymer had a number-average molecular weight greater than 8000.

(2) Analysis on Porous Structure of Polymer by TEM

Figure 3:
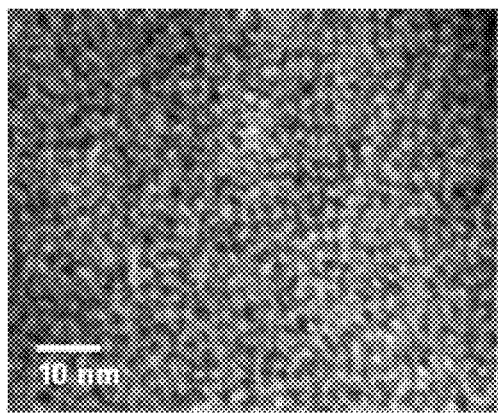
FIG. 3 shows the TEM picture of a thin film including the polymer of Example 4.

A thin film including the polymer Poly(DOPAM)-1 of Example 4 was made and taken to get the TEM (Transmission Electron Microscopy) image as shown in FIG. 3. The thin film was prepared in the manner that the solid powder of Poly(DOPAM)-1 was annealed at the melting temperature for 6 hours and quenched in liquid nitrogen. FIG. 3 is the TEM image of the thin film that was cut up in thickness about 50 to 120 nm and subjected to deposition of $RuO_4$ vapor. Referring to FIG. 3, the dark part shows the $RuO_4$ vapor deposited on the benzene group introduced in the polymer chain of Poly(DOPAM)-1 forming the frame of the cylindrical structure. It can be seen from FIG. 6 that the bright image structure with a pore size of about 3.5 nm is relatively uniformly distributed over the surface of the thin film. In conclusion, the polymers of the Examples contained a large number of pores with a uniform pore size. Thus, the polymers of the Examples were predicted to have superior storage efficiency for gas such as hydrogen due to the porosity and crystallinity.

Example 11-17

Preparation of Porous Electrospun Fiber from Novel Mesoporous Acrylamide-Based Polymer

Example 11

Poly(DOPAM)-3 (1.0 g) obtained Example 6 was dissolved in 5.1 mL of THF to produce the polymer solution with using electro-spinning device (ESR-200RD) (NanoNC). 5 mL of the polymer solution was poured into a syringe and was applied for electro-spinning device by using stainless needle having 25 gauge (diameter of 0.508 mm) under the condition of applied voltage of 15 kV, spinning speed of 15 mL/min, and the distance of 12 cm between the needle and collector to produce electrospun fiber. The result confirmed that the electrospun fiber had a diameter of 250 to 450 nm, and uniformly-distributed pore of diameter 20 to 50 nm on its surface.

Example 12

The procedures were performed to obtain a electrospun fiber in the same manner as described in Example 11, excepting that there were used the mesoporous polymer Poly(DOPAM)-4 (1.0 g) prepared in Example 7, 2.9 mL of THF, and applied voltage of 10 kV. The result confirmed that the electrospun fiber had a diameter of about 7 μm, and uniformly-distributed pore of diameter 70 to 400 nm on its uniform surface without any bead.

Example 13

The procedures were performed to obtain a electrospun fiber in the same manner as described in Example 1, excepting that applied voltage of 15 kV was used. The result confirmed that the electrospun fiber had a diameter of about 6 μm, and uniformly-distributed pore of diameter 100 to 300 nm on its surface.

Example 14

The procedures were performed to obtain a electrospun fiber in the same manner as described in Example 12, excepting that there were used 3.4 mL of THF, and applied voltage of 20 kV. SEM pictures of the electrospun fiber were shown in FIGS. 4a and 4b. The result confirmed that the electrospun fiber had a diameter of about 2 μm, and uniformly-distributed pore of diameter 100 to 400 nm on its surface.

Example 15

The procedures were performed to obtain a electrospun fiber in the same manner as described in Example 12, excepting that there were used the mesoporous polymer Poly(TEPAM) (1.0 g) prepared in Example 8 and applied voltage of 10 kV. The result confirmed that the electrospun fiber had a diameter of about 4 to 7 μm, and uniformly-distributed pore of diameter 100 to 500 nm on its surface.

Example 16

The procedures were performed to obtain a electrospun fiber in the same manner as described in Example 12, excepting that there were used the mesoporous polymer Poly(HEPAM) (1.0 g) prepared in Example 9 and applied voltage of 20 kV. The result confirmed that the electrospun fiber had a diameter of about 2 to 4 μm, and uniformly-distributed pore of diameter 100 to 250 nm on its surface.

Example 17

The procedures were performed to obtain a electrospun fiber in the same manner as described in Example 11, excepting that there were used the mesoporous polymer Poly(DOPPPAM) (1.0 g) prepared in Example 10, 3.2 mL of DMF, and applied voltage of 15 kV. The result confirmed that the electrospun fiber had a diameter of about 500 nm to 1.0 μm, and uniformly-distributed pore of diameter 40 to 80 nm on its surface.

Experimental Example 2

Analysis of Electrospun Fiber

Figure 4A:
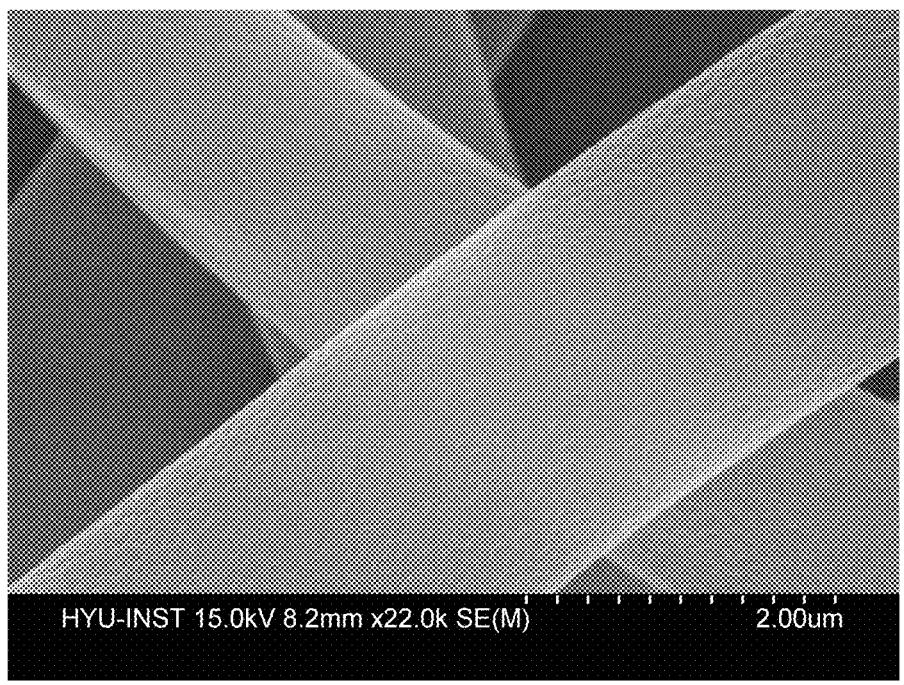
FIGS. 4a and 4b shows the SEM picture of electrospun fiber obtained in Example 14
Figure 4B:
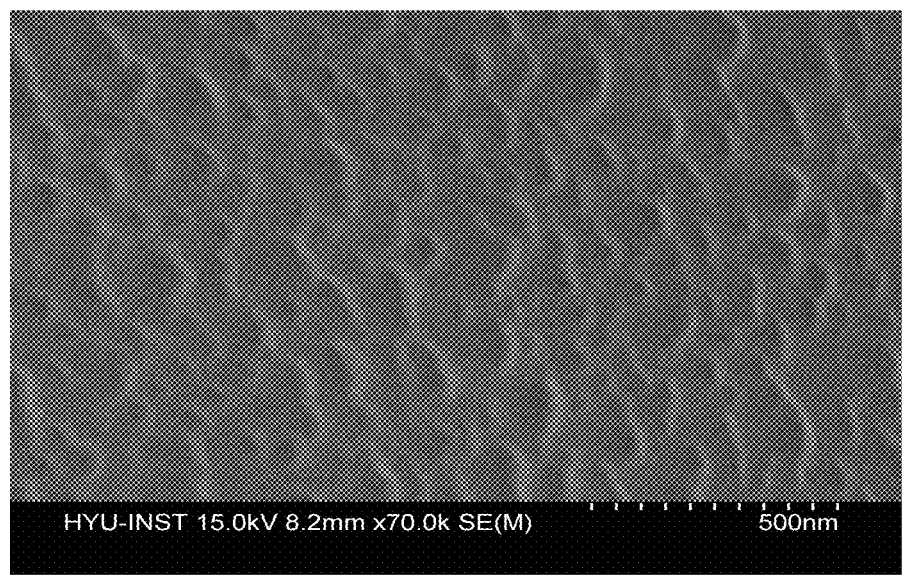

In the Example, the diameter and surface morphology of electrospun fiber was analyzed by SEM (scanning electron microscope, Hitachi S-4800). The SEM pictures are shown in FIGS. 4a to 4b. More specifically, the polymer solution of each Example was electrospun directly to silicon wafer (silicon wafer, 2.0×2.0 cm) to obtain the electrospun fiber. The electrospun fiber was dried under the vacuum, and analyzed at 15.0 kV with SEM.

Referring to the Examples and FIGS. 4a to 4b, the electrospun fiber of Examples 11 to 17 showed porosity that the uniformly-sized pores were on the surface of electrospun fiber, and had large surface area with the controlled diameter without forming bead. Thus, the electrospun fibers of the Examples were predicted to have superior storage efficiency for gas such as hydrogen due to the porosity and large surface area.

Experimental Example 3

Figure 5:
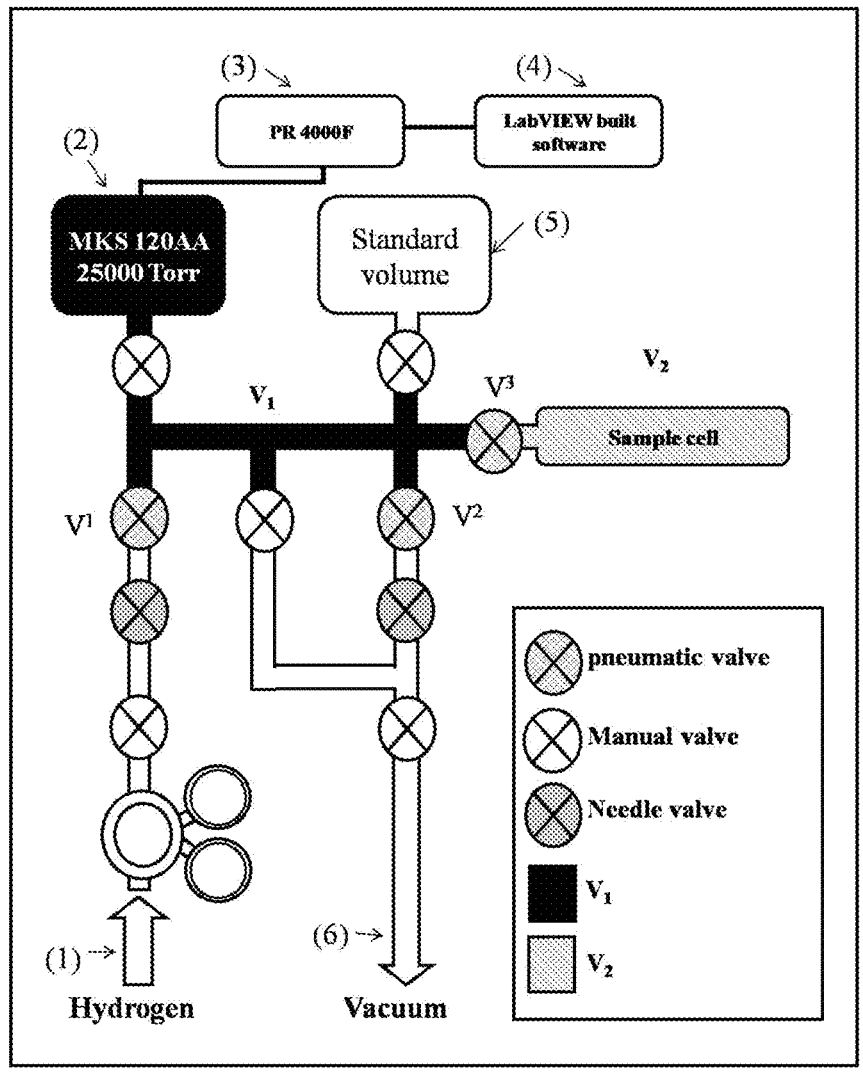
FIG. 5 shows schematic diagram of an apparatus used for hydrogen storage experiment using the polymer of Example 5.

Evaluation for Properties of Acrylamide-Based Mesoporous Polymer and Electrospun Fiber as Gas Storage Material Hydrogen storage experiment was performed for the polymer of Example 5 using a hydrogen storage apparatus of FIG. 5. For the experiment, the hydrogen gas was supplied with a uniform initial pressure to contact with the solid sample of the polymer. The storage amount of the hydrogen gas was measured from the change in pressure of the adsorbed hydrogen gas on the solid sample. In other words, the amount of the adsorbed hydrogen gas on the solid sample was calculated by Boyle-Charles' law.

Referring to FIG. 5, the hydrogen storage apparatus included (1) hydrogen gas supply means, and (2) a pressure gauge for the hydrogen gas (MKS-120AA; limit of determination: 25000 torr; accuracy: 0.12%). When the gas pressure to be measured was bigger than 25000 torr, a pressure gauge of MKS 870B (limit of determination: 3000 psi; accuracy: 1.00%) was used for the measurement. Further, the hydrogen storage apparatus included (3) connecting means to a display and a PC for converting the input voltage into the pressure unit (2-Channel Power Supply and Readout for Flow and Pressure: MKS PR 4000F), (4) a LabVIEW software (in the PC checking the change in pressure and the storage amount of the hydrogen gas in real time), (5) a standard cylinder for calculating volume (an equipment for calculating volume of the apparatus for the experiment), (6) a rotary cacuum pump (an equipment for removing residual gas in the hydrogen storage apparatus), and (7) $V^1, V^2, V^3$ Pneumatic valves (open and close of these valves were controlled by electric signals, and these valves were interlocked with the LabVIEW software).

Figure 6:
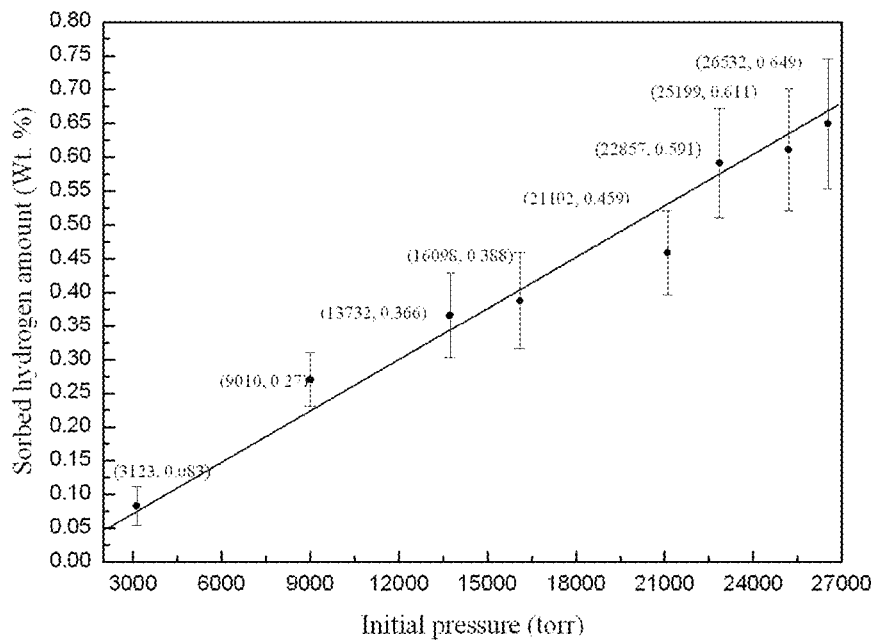
FIG. 6 is the graph from the hydrogen storage experiment using the polymer of Example 5, shows the relation between an initial pressure of the supplied hydrogen gas and the stored amount of the hydrogen gas.

The result of the hydrogen storage experiment was illustrated in FIG. 6. Referring to FIG. 6, as the initial pressure of the hydrogen gas increased, the storage amount of the hydrogen gas also increased. Further, when the initial pressure of the supplied hydrogen gas was about 26532 torr, the storage amount of the gas was about 0.65 wt % per 1.0 g of the solid sample of the polymer at a room temperature. From this result, it was confirmed that the polymer of Example 5 showed superior storage efficiency for the hydrogen gas.

Figure 7:
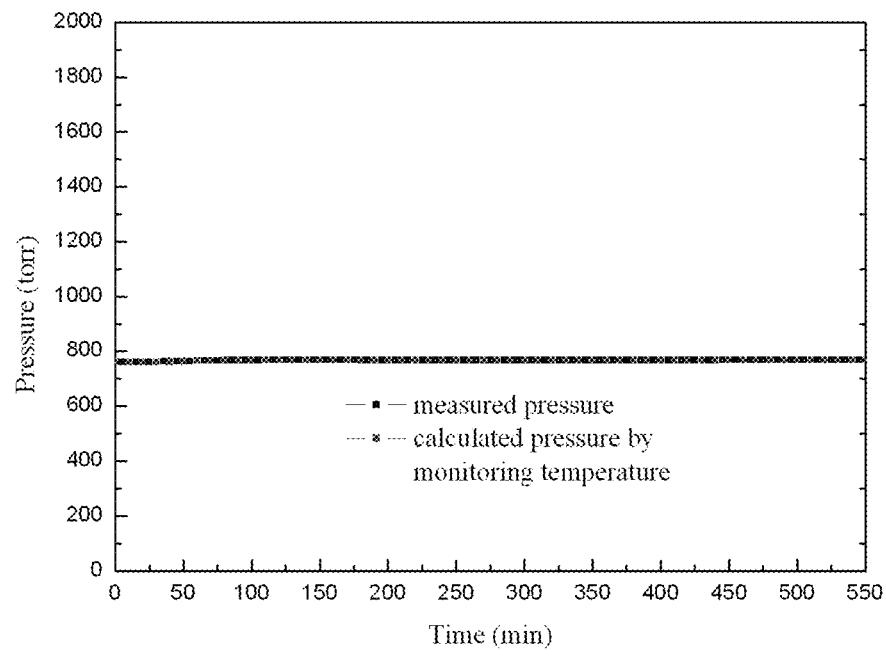
FIG. 7 shows the change in pressure of the hydrogen gas adsorbed and stored on the polymer of Example 5 at a room temperature and atmosphere.

Meanwhile, the adsorption stability of the solid sample of the polymer, which was adsorbing and storing the hydrogen gas, was evaluated, and the result was illustrated in FIG. 7. The evaluation was performed at a room temperature and atmosphere. According to the evaluation result, any change in pressure of the adsorbed and stored hydrogen gas on the sample was not identified even after 8 hrs at a room temperature. From this result, it was confirmed that the polymer of Example 5 can stably adsorb and store the hydrogen gas for a considerable time.

Figure 8:
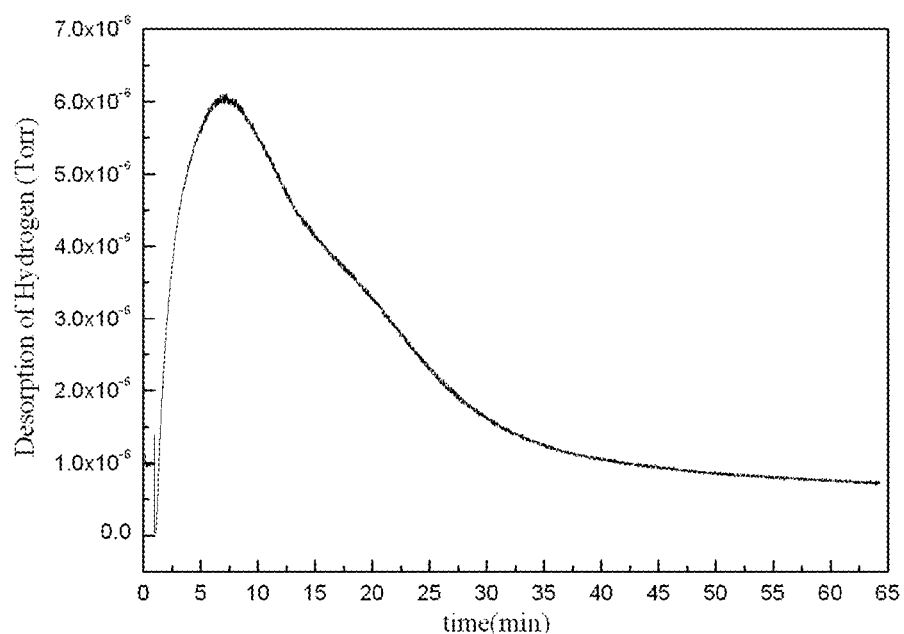
FIG. 8 shows the change in pressure of the hydrogen gas adsorbed and stored on the polymer of Example 5, when releasing the hydrogen gas at a reduced pressure.

In addition, under a reduced pressure of $1.0 \times 10^{-6}$ torr provided by a vacuum pump, it was checked as to whether the solid sample of the polymer could stably desorb and release the adsorbed hydrogen gas, or not. The gas release was checked by measuring the change in pressure following the desorption and release of the hydrogen gas using a residual gas analyzer (SRS RGA-100). The result was illustrated in FIG. 8. Referring to FIG. 8, the polymer of Example 5 released most of the hydrogen gas, which had been adsorbed and stored on the sample, within 30 min at a reduced pressure. Thus, it was confirmed that the polymer can stably and effectively desorb and release the hydrogen gas when needed.

Lastly, hydrogen storage experiment was performed for the electrospun fiber of Example 14 by a similar method for the solid sample of the polymer of Example 5. However, the initial pressure of the supplied hydrogen gas was about 21220 torr. As the experimental result, the storage amount of the gas on the electrospun fiber was about 2.65 wt % per 1 g of the fiber, which was about 5.7 times higher than the storage amount of the solid sample of the polymer. In addition, by a similar method for the solid sample of the polymer of Example 5, it was confirmed that the electrospun fiber can stably adsorb and store the hydrogen gas at a room temperature, and can stably and effectively release the adsorbed hydrogen gas at a reduced pressure.

The invention claimed is:

1. A method for gas storage comprising the step of contacting and adsorbing a target gas onto a gas storage material, wherein the gas storage material comprises an acrylamide-based polymer comprising at least one repeating unit represented by Chemical Formula 1:

[Chemical Formula 1]

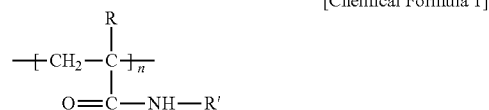

wherein, in Chemical Formula 1:
n is an integer of 15 to 1,800,
R is hydrogen or methyl; and
R' is X,

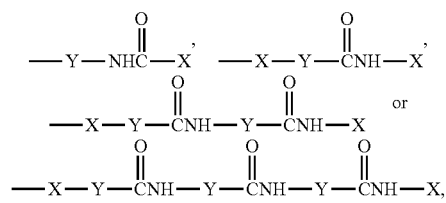

wherein X is —Z—R''; Y is alkylene having 1 to 10 carbon atoms; Z is arylene having 6 to 20 carbon atoms; and R'' is a linear or branched hydrocarbon having 10 to 20 carbon atoms, or a linear or branched perfluorohydrocarbon having 10 to 20 carbon atoms.

2. The method of claim 1, wherein the acrylamide-based polymer includes a plurality of pores having a diameter of 2.0 to 10.0 nm.

3. The method of claim 1, wherein the acrylamide-based polymer has a number-average molecular weight of 5,000 to 500,000.

4. The method of claim 1, wherein the material comprises a porous electrospun fiber comprising the acrylamide-based polymer.

5. The method of claim 4, wherein the porous electrospun fiber includes a plurality of pores having a diameter of 20 to 500 nm on surface.

6. The method of claim 4, wherein the porous electrospun fiber has a diameter of 200 nm to 10 μm.

7. The method of claim 1, wherein the material is used for storage of gaseous hydrogen ($H_2$), methane ($CH_4$) or carbon dioxide ($CO_2$).

\* \* \* \* \*